D. R. PRATT.
Car-Spring.

No. 168,846.

Patented Oct. 19, 1875.

Witnesses:
B. F. Edwards,
J. S. Payne.

Inventor:
Daniel R. Pratt,
by B. F. James,
his atty.

UNITED STATES PATENT OFFICE.

DANIEL R. PRATT, OF NEW YORK, N. Y.

IMPROVEMENT IN CAR-SPRINGS.

Specification forming part of Letters Patent No. 168,846, dated October 19, 1875; application filed August 26, 1875.

*To all whom it may concern:*

Be it known that I, DANIEL R. PRATT, of the city of New York, in the county of New York and State of New York, have invented certain new and useful Improvements in Railway-Car Springs; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of my invention consists in the construction and arrangement of india-rubber springs for railway-cars and other purposes, of a spiral configuration, both on the outer and inner side, so that a very elastic and yielding spring is produced, and in a very economical manner. The spiral form of the spring adds not only to its strength, but to its elasticity, presenting a uniformity of thickness in its whole length, which thickness can be varied in the manufacture of the same, to correspond to the purposes to which such springs may be applied. By this mode of construction greater perfection is attained in the curing of the same through the whole body of the spring, and presents, in one whole, a series of springs, operating one upon the other, producing greater certainty and uniformity in its action.

Figure 1:
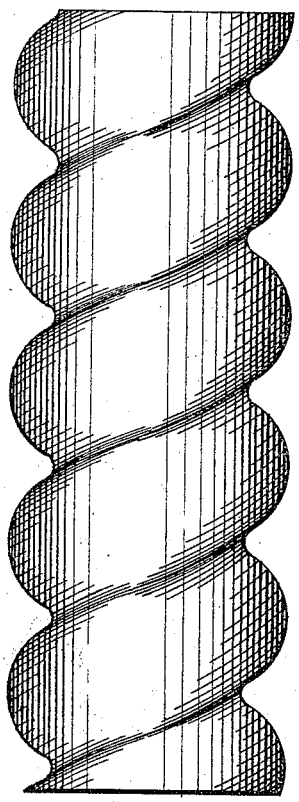
Figure 2:
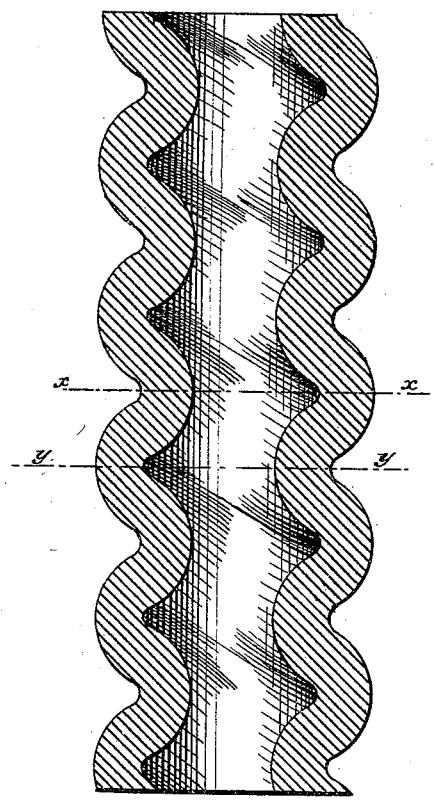
Figure 3:
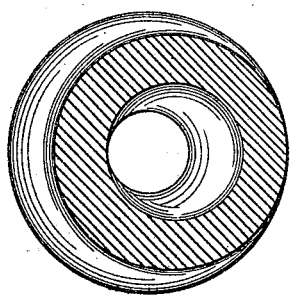
Figure 4:
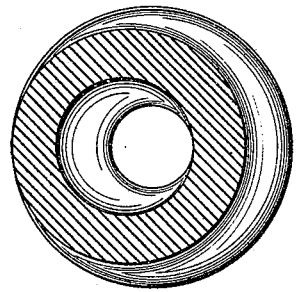

In the drawings, Figure 1 shows the external form of my spiral india-rubber spring. Fig. 2 is a cross vertical section of Fig. 1, showing the internal form and configuration of the same; Fig. 3, a cross-section in line $x\,x$, and Fig. 4 a cross-section in line $y\,y$ in Fig. 1.

In the manufacture and construction of my spring, I use a core of spiral form, and of the size and dimensions of the spring desired. A shell of corresponding configuration may surround this core, and the spring cast, and when the rubber is sufficiently set or hardened the inner core can be turned or screwed out of the rubber, and the spring cured by heat or steam in the usual manner. By this method springs of any desired length can be produced and easily adjusted to any position where such springs are desired to be used or employed, and secured within guides or upon a rod running through them, to prevent any lateral or other movement except in line with the spring. The form and uniform thickness of the spring imparts a great degree of strength and elasticity, and admits of a greater degree of certainty in the hardening or curing the whole body of the spring.

As different forms or configurations of springs may be adapted to many different purposes while preserving the same principle of construction and operation, and such varied purposes requiring, as may be, a small or large spring, and as another form and construction of india-rubber car-spring is the subject of a separate application for a patent, I hereby disclaim any and all other forms and configurations of car-springs except that herein shown and described.

What I claim as my invention, and desire to secure by Letters Patent, is—

1. A car-spring, constructed of india-rubber, and of spiral form externally and internally, substantially as and for the purpose set forth.

2. A railway-car spring, constructed of india-rubber, and having the external and internal spirals to conform one with the other its entire length, as set forth.

In testimony that I claim the foregoing as my own I affix my signature in presence of two witnesses.

DANIEL R. PRATT.

Witnesses:
E. F. M. FAEHTZ,
B. F. JAMES.